United States Patent
Cizas et al.

(10) Patent No.: US 8,908,870 B2
(45) Date of Patent: Dec. 9, 2014

(54) METHOD AND SYSTEM FOR TRANSFERRING INFORMATION TO A DEVICE

(75) Inventors: Jurijus Cizas, Castro Valley, CA (US); Shrinath Eswarahally, Sunnyvale, CA (US); Peter Laackmann, Munich (DE); Berndt Gammel, Markt-Schwaben (DE); Mark Stafford, San Carlos, CA (US); Joerg Borchert, Los Gatos, CA (US)

(73) Assignee: Infineon Technologies AG, Neubiberg (DE)

( * ) Notice: Subject to any disclaimer, the term of this patent is extended or adjusted under 35 U.S.C. 154(b) by 1856 days.

(21) Appl. No.: 12/062,961

(22) Filed: Apr. 4, 2008

(65) Prior Publication Data

US 2009/0116650 A1    May 7, 2009

Related U.S. Application Data

(60) Provisional application No. 60/984,559, filed on Nov. 1, 2007.

(51) Int. Cl.
*H04L 9/08* (2006.01)
*G06F 21/76* (2013.01)

(52) U.S. Cl.
CPC .............. *G06F 21/76* (2013.01); *H04L 9/0866* (2013.01); *H04L 9/0822* (2013.01); *G06F 2221/2107* (2013.01); *G06F 2221/2115* (2013.01); *G06F 2221/2129* (2013.01)
USPC ........................................ 380/284

(58) Field of Classification Search
USPC .................................................. 380/278, 44
See application file for complete search history.

(56) References Cited

U.S. PATENT DOCUMENTS

| | | | | |
|---|---|---|---|---|
| 5,455,863 A | * | 10/1995 | Brown et al. | 380/247 |
| 5,552,776 A | * | 9/1996 | Wade et al. | 340/5.74 |
| 5,628,028 A | | 5/1997 | Michelson | |
| 5,686,904 A | * | 11/1997 | Bruwer | 340/5.23 |
| 5,771,287 A | * | 6/1998 | Gilley et al. | 713/191 |
| 5,862,339 A | * | 1/1999 | Bonnaure et al. | 709/227 |
| 5,970,142 A | * | 10/1999 | Erickson | 713/189 |
| 6,069,647 A | | 5/2000 | Sullivan et al. | |
| 6,111,953 A | * | 8/2000 | Walker et al. | 380/51 |

(Continued)

FOREIGN PATENT DOCUMENTS

| | | |
|---|---|---|
| EP | 1170868 | 1/2002 |
| WO | 03034199 | 4/2003 |

OTHER PUBLICATIONS

Kean, Cryptographic Rights Management of FPGA Intellectual Property Cores, Paper, 7 pages.

(Continued)

*Primary Examiner* — Fatoumata Traore
(74) *Attorney, Agent, or Firm* — Dicke, Billig & Czaja, PLLC

(57) ABSTRACT

Methods and systems for transferring information to a device include assigning a unique identifier to a device and generating a unique key for the device. The device is located at a first site, and the unique identifier is sent from the device to a second site. The unique key is obtained at the second site, and it is used for encrypting information at the second site. The encrypted information is sent from the second site to the device, where it can then be decrypted.

19 Claims, 4 Drawing Sheets

(56) References Cited

U.S. PATENT DOCUMENTS

| | | | |
|---|---|---|---|
| RE36,946 E * | 11/2000 | Diffie et al. | 380/278 |
| 6,167,137 A * | 12/2000 | Marino et al. | 380/255 |
| 6,191,701 B1 * | 2/2001 | Bruwer | 340/5.22 |
| 6,209,091 B1 * | 3/2001 | Sudia et al. | 713/175 |
| 6,216,265 B1 * | 4/2001 | Roop et al. | 725/54 |
| 6,230,267 B1 * | 5/2001 | Richards et al. | 713/172 |
| 6,237,054 B1 | 5/2001 | Freitag, Jr. | |
| 6,259,908 B1 | 7/2001 | Austin | |
| 6,367,010 B1 * | 4/2002 | Venkatram et al. | 713/171 |
| 6,385,723 B1 * | 5/2002 | Richards | 713/160 |
| 6,386,451 B1 | 5/2002 | Sehr | |
| 6,393,564 B1 * | 5/2002 | Kanemitsu et al. | 713/168 |
| 6,424,718 B1 * | 7/2002 | Holloway | 380/277 |
| 6,438,235 B2 * | 8/2002 | Sims, III | 380/285 |
| 6,457,125 B1 | 9/2002 | Matthews, Jr. et al. | |
| 6,460,023 B1 * | 10/2002 | Bean et al. | 705/54 |
| 6,496,928 B1 * | 12/2002 | Deo et al. | 713/153 |
| 6,560,665 B1 | 5/2003 | Resler et al. | |
| 6,565,000 B2 | 5/2003 | Sehr | |
| 6,587,842 B1 * | 7/2003 | Watts | 705/57 |
| 6,609,197 B1 | 8/2003 | Ketcham et al. | |
| 6,684,198 B1 * | 1/2004 | Shimizu et al. | 705/50 |
| 6,715,078 B1 * | 3/2004 | Chasko et al. | 713/193 |
| 6,769,060 B1 | 7/2004 | Dent et al. | |
| 6,810,406 B2 * | 10/2004 | Schlabach et al. | 1/1 |
| 6,836,805 B1 * | 12/2004 | Cook | 709/245 |
| 6,848,047 B1 * | 1/2005 | Morikawa et al. | 713/159 |
| 6,907,126 B2 * | 6/2005 | Inada | 380/255 |
| 6,915,434 B1 * | 7/2005 | Kuroda et al. | 713/193 |
| 6,970,565 B1 * | 11/2005 | Rindsberg | 380/270 |
| 7,014,120 B2 | 3/2006 | Al Amri | |
| 7,162,644 B1 * | 1/2007 | Trimberger | 713/189 |
| 7,203,842 B2 * | 4/2007 | Kean | 713/189 |
| 7,225,339 B2 * | 5/2007 | Asano et al. | 713/193 |
| 7,269,738 B1 | 9/2007 | Kivimaki | |
| 7,475,812 B1 * | 1/2009 | Novozhenets et al. | 235/382 |
| 7,546,455 B2 | 6/2009 | Kakii | |
| 7,590,860 B2 * | 9/2009 | Leporini et al. | 713/185 |
| 7,697,691 B2 * | 4/2010 | Sutton et al. | 380/277 |
| 7,757,294 B1 | 7/2010 | Simkins | |
| 7,783,884 B2 * | 8/2010 | Nakano et al. | 713/175 |
| 7,788,502 B1 | 8/2010 | Donlin et al. | |
| 7,971,072 B1 | 6/2011 | Donlin et al. | |
| 8,065,517 B2 | 11/2011 | Cizas et al. | |
| 8,234,501 B2 | 7/2012 | Stafford et al. | |
| 2001/0016836 A1 * | 8/2001 | Boccon-Gibod et al. | 705/51 |
| 2001/0029581 A1 * | 10/2001 | Knauft | 713/193 |
| 2001/0032878 A1 * | 10/2001 | Tsiounis et al. | 235/379 |
| 2001/0037452 A1 * | 11/2001 | Go et al. | 713/168 |
| 2001/0037457 A1 * | 11/2001 | Inada | 713/189 |
| 2001/0037458 A1 * | 11/2001 | Kean | 713/193 |
| 2001/0056404 A1 * | 12/2001 | Kuriya et al. | 705/51 |
| 2002/0001386 A1 * | 1/2002 | Akiyama | 380/201 |
| 2002/0004784 A1 * | 1/2002 | Forbes et al. | 705/51 |
| 2002/0007454 A1 * | 1/2002 | Tarpenning et al. | 713/156 |
| 2002/0013898 A1 * | 1/2002 | Sudia et al. | 713/155 |
| 2002/0013940 A1 * | 1/2002 | Tsukamoto et al. | 725/5 |
| 2002/0023223 A1 * | 2/2002 | Schmidt et al. | 713/187 |
| 2002/0046175 A1 * | 4/2002 | Bleumer | 705/51 |
| 2002/0069361 A1 * | 6/2002 | Watanabe et al. | 713/185 |
| 2002/0114452 A1 * | 8/2002 | Hamilton | 380/42 |
| 2002/0114454 A1 * | 8/2002 | Hamilton | 380/200 |
| 2002/0118837 A1 * | 8/2002 | Hamilton | 380/277 |
| 2002/0150243 A1 * | 10/2002 | Craft et al. | 380/201 |
| 2002/0199110 A1 * | 12/2002 | Kean | 713/189 |
| 2003/0016826 A1 * | 1/2003 | Asano et al. | 380/277 |
| 2003/0016827 A1 * | 1/2003 | Asano et al. | 380/277 |
| 2003/0023858 A1 | 1/2003 | Banerjee et al. | |
| 2003/0051151 A1 * | 3/2003 | Asano et al. | 713/193 |
| 2003/0056107 A1 * | 3/2003 | Cammack et al. | 713/189 |
| 2003/0059051 A1 | 3/2003 | Hatano et al. | |
| 2003/0074564 A1 * | 4/2003 | Peterson | 713/182 |
| 2003/0086571 A1 * | 5/2003 | Audebert et al. | 380/277 |
| 2003/0095664 A1 * | 5/2003 | Asano et al. | 380/277 |
| 2003/0097558 A1 * | 5/2003 | England et al. | 713/155 |
| 2003/0120611 A1 * | 6/2003 | Yoshino et al. | 705/67 |
| 2003/0126430 A1 * | 7/2003 | Shimada et al. | 713/155 |
| 2003/0126450 A1 * | 7/2003 | Master et al. | 713/189 |
| 2003/0185396 A1 * | 10/2003 | Asano et al. | 380/277 |
| 2003/0221011 A1 | 11/2003 | Shitano | |
| 2004/0006713 A1 | 1/2004 | Minemura | |
| 2004/0030891 A1 * | 2/2004 | Kurihara | 713/168 |
| 2004/0030918 A1 * | 2/2004 | Karamchedu et al. | 713/200 |
| 2004/0086127 A1 * | 5/2004 | Candelore | 380/281 |
| 2004/0125402 A1 * | 7/2004 | Kanai et al. | 358/1.15 |
| 2004/0168063 A1 * | 8/2004 | Revital et al. | 713/172 |
| 2004/0247128 A1 * | 12/2004 | Patariu et al. | 380/277 |
| 2004/0247129 A1 * | 12/2004 | Patariu et al. | 380/277 |
| 2004/0259529 A1 * | 12/2004 | Suzuki | 455/411 |
| 2005/0021539 A1 * | 1/2005 | Short et al. | 707/100 |
| 2005/0049886 A1 * | 3/2005 | Grannan et al. | 705/1 |
| 2005/0071631 A1 * | 3/2005 | Langer | 713/156 |
| 2005/0123141 A1 * | 6/2005 | Suzuki | 380/277 |
| 2005/0149758 A1 | 7/2005 | Park | |
| 2005/0160476 A1 | 7/2005 | Kakii | |
| 2005/0172154 A1 * | 8/2005 | Short et al. | 713/201 |
| 2005/0195975 A1 * | 9/2005 | Kawakita | 380/30 |
| 2005/0228994 A1 * | 10/2005 | Kasai et al. | 713/168 |
| 2005/0240778 A1 | 10/2005 | Saito | |
| 2006/0018474 A1 | 1/2006 | Hori et al. | |
| 2006/0059368 A1 * | 3/2006 | Fayad et al. | 713/189 |
| 2006/0059369 A1 * | 3/2006 | Fayad et al. | 713/189 |
| 2006/0059372 A1 | 3/2006 | Fayar et al. | |
| 2006/0059373 A1 | 3/2006 | Fayad et al. | |
| 2006/0059574 A1 | 3/2006 | Fayad et al. | |
| 2006/0069737 A1 * | 3/2006 | Gilhuly et al. | 709/207 |
| 2006/0080464 A1 * | 4/2006 | Kozuki | 709/245 |
| 2006/0107059 A1 * | 5/2006 | Lewis et al. | 713/176 |
| 2006/0116890 A1 * | 6/2006 | Nakamura et al. | 705/1 |
| 2006/0155990 A1 * | 7/2006 | Katsube et al. | 713/168 |
| 2006/0177064 A1 * | 8/2006 | Holtzman et al. | 380/277 |
| 2006/0182282 A1 * | 8/2006 | Negahdar | 380/277 |
| 2006/0191009 A1 * | 8/2006 | Ito et al. | 726/23 |
| 2006/0242465 A1 * | 10/2006 | Cruzado et al. | 714/30 |
| 2006/0242696 A1 * | 10/2006 | Cruzado et al. | 726/16 |
| 2006/0259965 A1 | 11/2006 | Chen | |
| 2006/0265603 A1 | 11/2006 | McLean et al. | |
| 2006/0277414 A1 | 12/2006 | Kotani et al. | |
| 2007/0030974 A1 * | 2/2007 | Ishibashi et al. | 380/281 |
| 2007/0043978 A1 * | 2/2007 | Cruzado et al. | 714/38 |
| 2007/0044158 A1 * | 2/2007 | Cruzado et al. | 726/27 |
| 2007/0074045 A1 * | 3/2007 | Van Essen et al. | 713/189 |
| 2007/0101157 A1 * | 5/2007 | Faria | 713/193 |
| 2007/0101434 A1 * | 5/2007 | Jevans | 726/26 |
| 2007/0124603 A1 * | 5/2007 | Yamamichi et al. | 713/194 |
| 2007/0130294 A1 * | 6/2007 | Nishio | 709/219 |
| 2007/0168676 A1 | 7/2007 | Fayad et al. | |
| 2007/0200661 A1 * | 8/2007 | Blum | 340/5.25 |
| 2007/0204170 A1 * | 8/2007 | Oren et al. | 713/189 |
| 2007/0250649 A1 | 10/2007 | Hickey et al. | |
| 2007/0263872 A1 * | 11/2007 | Kirkup et al. | 380/273 |
| 2007/0266247 A1 * | 11/2007 | Kirkup et al. | 713/171 |
| 2007/0274520 A1 * | 11/2007 | Ogata | 380/201 |
| 2007/0274525 A1 * | 11/2007 | Takata et al. | 380/270 |
| 2007/0276765 A1 * | 11/2007 | Hazel et al. | 705/71 |
| 2007/0282749 A1 * | 12/2007 | Nonaka et al. | 705/51 |
| 2007/0283151 A1 * | 12/2007 | Nakano et al. | 713/168 |
| 2008/0010449 A1 * | 1/2008 | Holtzman et al. | 713/157 |
| 2008/0010450 A1 * | 1/2008 | Holtzman et al. | 713/157 |
| 2008/0010451 A1 * | 1/2008 | Holtzman et al. | 713/158 |
| 2008/0010452 A1 * | 1/2008 | Holtzman et al. | 713/158 |
| 2008/0010455 A1 * | 1/2008 | Holtzman et al. | 713/168 |
| 2008/0010458 A1 * | 1/2008 | Holtzman et al. | 713/175 |
| 2008/0022395 A1 * | 1/2008 | Holtzman et al. | 726/19 |
| 2008/0040284 A1 * | 2/2008 | Hazel et al. | 705/64 |
| 2008/0044029 A1 * | 2/2008 | Gilhuly et al. | 380/278 |
| 2008/0046528 A1 * | 2/2008 | Gilhuly et al. | 709/206 |
| 2008/0046529 A1 * | 2/2008 | Gilhuly et al. | 709/206 |
| 2008/0101613 A1 * | 5/2008 | Brunts et al. | 380/279 |
| 2008/0155260 A1 | 6/2008 | Perez et al. | |
| 2008/0186052 A1 | 8/2008 | Needham et al. | |
| 2008/0209012 A1 * | 8/2008 | Abujbara et al. | 709/219 |
| 2008/0219449 A1 * | 9/2008 | Ball et al. | 380/277 |
| 2008/0260155 A1 * | 10/2008 | Kasahara et al. | 380/277 |

(56) References Cited

U.S. PATENT DOCUMENTS

| | | | |
|---|---|---|---|
| 2008/0263224 A1* | 10/2008 | Gilhuly et al. | 709/242 |
| 2008/0282087 A1 | 11/2008 | Stollon et al. | |
| 2008/0288410 A1* | 11/2008 | Nino | 705/52 |
| 2008/0319823 A1* | 12/2008 | Ahn et al. | 705/10 |
| 2009/0144526 A1 | 6/2009 | Cizas et al. | |
| 2009/0144553 A1 | 6/2009 | Stafford et al. | |
| 2009/0172392 A1 | 7/2009 | Cizas et al. | |
| 2009/0172401 A1 | 7/2009 | Cizas et al. | |
| 2009/0274297 A1* | 11/2009 | Cho et al. | 380/44 |
| 2009/0276627 A1* | 11/2009 | Cho et al. | 713/168 |
| 2010/0017599 A1* | 1/2010 | Sellars et al. | 713/156 |
| 2010/0031026 A1 | 2/2010 | Cizas et al. | |
| 2010/0088515 A1* | 4/2010 | Nishimoto et al. | 713/168 |
| 2010/0235624 A1* | 9/2010 | Candelore | 713/155 |
| 2011/0176675 A1* | 7/2011 | Hughes et al. | 380/44 |

OTHER PUBLICATIONS

Simpson et al., Offline HW/SW Authentication for Reconfigurable Platforms, Paper, 13 pages.

Schneier, B, "Applied Cryptography, Protocols, Algorithms, and Source Code in C," Applied Cryptography, Second Edition, XP-002121376, pp. 53-54, (Jan. 1, 1996).

European Search Report for European Patent Application No. EP 08 01 9115.8 dated Mar. 10, 2009 (6 pages).

Menezes et al., "Handbook of Applied Cryptography: Ch. 10 Identification and Entity Authentication," (Jan. 1, 1997), pp. 400-405, XP002143934 ISBN: 978-0-8493-8523-0.

The Communication for European Patent Application No. EP 08 019 115.8 dated Dec. 2, 2009. (4 pgs.).

B. Schneier, "Applied Cryptography, Second Edition, Protocols, Algorithms, and Source Code in C: Ch. 24 Example Implementations," (Jan. 1, 1996), pp. 574-577, XP002922914 ISBN: 978-0-471-11709-4.

The Office Action for U.S. Appl. No. 11/948,952 mailed Dec. 10, 2010 (17 pgs.).

The Final Office Action for U.S. Appl. No. 11/948,952 mailed May 26, 2011 (15 pgs.).

The Examiner Interview Summary for U.S. Appl. No. 11/948,952 mailed Jul. 26, 2011 (3 pgs.).

The Office Action for U.S. Appl. No. 11/948,952 mailed Aug. 9, 2011 (14 pgs.).

The Final Office Action for U.S. Appl. No. 11/948,952 mailed Jan. 18, 2012 (19 pgs.).

The Notice of Allowance for U.S. Appl. No. 11/948,952 mailed Mar. 30, 2012 (5 pgs.).

The Office Action for U.S. Appl. No. 11/948,962 mailed Aug. 20, 2009 (12 pgs.).

The Final Office Action for U.S. Appl. No. 11/948,962 mailed Feb. 2, 2010 (11 pgs.).

The Advisory Action for U.S. Appl. No. 11/948,962 mailed Apr. 15, 2010 (3 pgs.).

The Office Action for U.S. Appl. No. 11/948,962 mailed Mar. 28, 2011 (9 pgs.).

The Office Action for U.S. Appl. No. 12/062,937 mailed Apr. 12, 2012 (18 pgs.).

The Final Office Action for U.S. Appl. No. 12/062,937 mailed Aug. 23, 2012 (15 pgs.).

The Advisory Action for U.S. Appl. No. 12/062,937 mailed Oct. 25, 2012 (3 pgs.).

The Office Action for U.S. Appl. No. 12/062,937 mailed May 8, 2013 (16 pgs.).

The Office Action for U.S. Appl. No. 12/062,987 mailed Dec. 28, 2011 (36 pgs.).

The Office Action for U.S. Appl. No. 12/098,011 mailed Jan. 19, 2011 (25 pgs.).

The Notice of Allowance for U.S. Appl. No. 12/098,011 mailed Jun. 30, 2011 (5 pgs.).

\* cited by examiner

METHOD AND SYSTEM FOR TRANSFERRING INFORMATION TO A DEVICE

CROSS-REFERENCE TO RELATED APPLICATIONS

This application claims the benefit of U.S. Provisional Application No. 60/984,559, filed on Nov. 1, 2007, which is incorporated by reference. This application is related to U.S. patent application Ser. No. 12/062,937 "METHOD AND SYSTEM FOR CONTROLLING A DEVICE"; U.S. patent application Ser. No. 12/062,987 "METHOD AND SYSTEM FOR TRANSFERRING INFORMATION TO A DEVICE"; and U.S. patent application Ser. No. 12/098,011, now U.S. Pat. No. 8,065,517 "METHOD AND SYSTEM FOR TRANSFERRING INFORMATION TO A DEVICE"; all filed the same day as the present application and all incorporated by reference.

BACKGROUND

Various electronic devices provide characteristics that can be changed after production, including digital signal processors (DSP), field programmable gate arrays (FPGA), etc. For example, an FPGA is an integrated circuit device containing programmable logic components sometimes referred to as "logic blocks," and programmable interconnects. Logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memories. The logic blocks and interconnects can be programmed after the FPGA is manufactured ("field programmable") to implement the desired functions.

Such devices may have a trustworthiness that is limited due to a lack of a root of trust at the start of the device lifecycle and throughout the subsequent lifecycle stages. The root of trust is where the trustworthiness begins in a process. Attempts to address this shortcoming include programming a global secret into FPGAs during production. These FPGAs are then broadly distributed in the marketplace. However, there is no single root of trust available for programming the FPGAs or for subsequent lifecycle management to securely validate integrity. If one key (secret) is compromised, a large number of FPGAs (an entire production run) could be compromised.

For these and other reasons, there is a need for the present invention.

SUMMARY

Embodiments of a system and method for transferring information to a device include assigning a unique identifier to a device. A unique key for the device for the device is generated, and the device is located at a first site. The unique identifier is sent from the device to a second site. The unique key is obtained at the second site and used for encrypting information, which is sent from the second site to the device.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
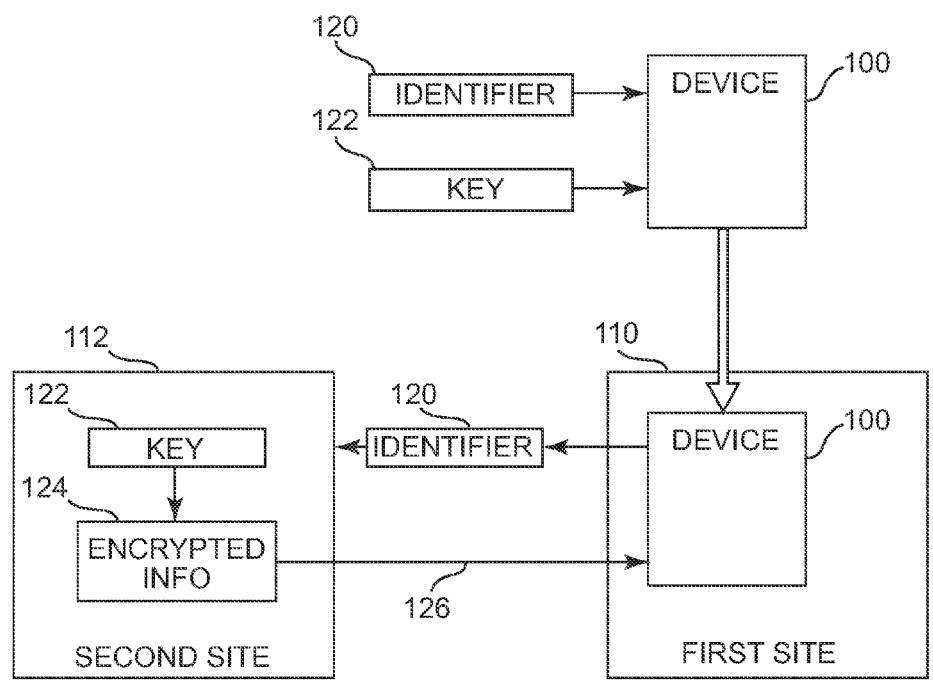
FIG. 1 is a block diagram conceptually illustrating embodiments of a method and system for transferring information to a device.

FIG. 1 is block diagram conceptually illustrating embodiments of a method and system for securely transferring information to a device 100. In one embodiment, the device 100 is an integrated circuit. Many types of integrated circuit devices have characteristics or programs that can be changed or require updating after production, such as various microprocessors or microcontrollers, digital signal processors (DSP), field programmable gate arrays (FPGA), etc. Providing a secure way to transfer such information to devices located at an untrusted location allows for, among other things, improved or enhanced lifestyle management of the devices.

With certain integrated circuit devices, such as an FPGA, it may be necessary to send information, such as an updated program file generated at a trusted site, to the device 100 located at an untrusted site. In the illustrated embodiment, this information is sent over an unsecure public network. In various embodiments, the network is a local area network (LAN), a network utilizing TCP/IP (Transmission Control Protocol/Internet Protocol), or a private network such as an intranet or an extranet. The system illustrated in FIG. 1 includes a first (untrusted) site 110 and a second (trusted) site 112.

Prior to being located at the untrusted site 110, a unique identifier 120 is assigned to the device 100 and a unique key 122 is generated for the device 100. This occurs, for example, at a production site such as a chip factory. The unique identifier may include any suitable information that is compatible with a cryptographic algorithm. The unique key 122 is associated with the unique identifier 120. The unique identifier 120 and the unique key 122 can be stored in the device 100, for example, in a nonvolatile memory of the device 100.

After production, the device 100 with the unique identifier 120 and the unique key 122 is shipped to the first, or untrusted site 110. To securely send information such as a program file to the device 100, the unique identifier 120 is sent from the device 100 to the second, trusted site 112. A suitable computing system with memory, etc. is located at the second site 112. In one embodiment, the unique identifier 120 is sent over a public unsecured network. In the illustrated embodiment, the unique key 122 is obtained at the second site, for example, by using the unique identifier 120, and is used to encrypt the information to be sent to the device 100 at the untrusted site 110. After encryption at the trusted site 112, the encrypted information 124 is sent to the device 100 at the untrusted site 110. In the illustrated embodiment, the encrypted information 124 is sent over the public, unsecure network 126. The received encrypted information 124 can then be decrypted by the device 100 at the untrusted site.

Figure 2:
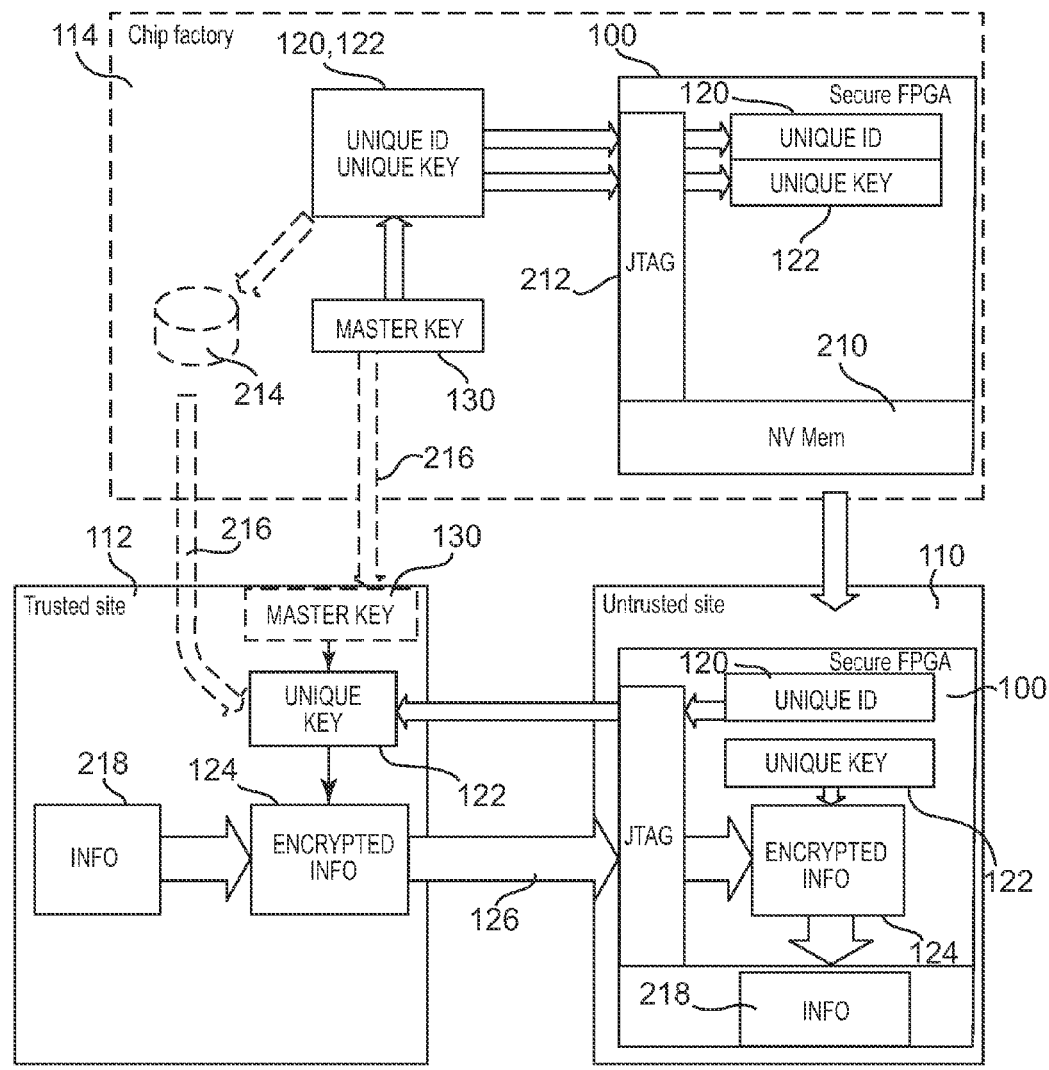
FIG. 2 is a block diagram conceptually illustrating embodiments of a method and system for transferring information to a device.

FIG. 2 illustrates further aspects of a method and system that provides for the secure transfer of information to a device. Among other things, the embodiment of the system illustrated in FIG. 2 uses symmetric keys. For simplicity of illustration and description, the example system of FIG. 2 is disclosed in terms of an FPGA as the device 100. As noted above in conjunction with FIG. 1, during the production of the FPGA 100 in a secure environment such as a chip factory 114, the unique identifier 120 is generated and assigned to the secure FPGA 100. The unique identifier 120 may be stored, for example, in a suitable nonvolatile memory such as a flash or One Time Programmable (OTP) memory 210 on the device 100. In the illustrated embodiment, the unique identifier 120 is device-specific information, such as a unique identification number generated during manufacturing of at least part of the secure FPGA 100. In other embodiments, the chip unique identifier can be any suitable indicia that can be used to distinguish an individual FPGA from another FPGA. In other embodiments, each chip unique identifier may correspond to two or more FPGA devices.

The unique key 122 is also generated and stored in the FPGA 100, for example, in nonvolatile memory such as the FPGA flash memory 210. The unique identifier 120 and unique key 122 can transmitted to the FPGA 100 via any suitable interface, such as a JTAG interface 212. In the embodiment illustrated in FIG. 2, the unique key 122 is generated using the unique identifier 120 together with a master key 130. The master key 130 comprises a block of suitable data such as random data or a pseudo-random number. In other embodiments, the master key 130 is associated with group or batch information. In the illustrated embodiment, the unique identifier 120 and the master key 130 have a format that is compatible with the cryptographic algorithm being used.

Figure 3:
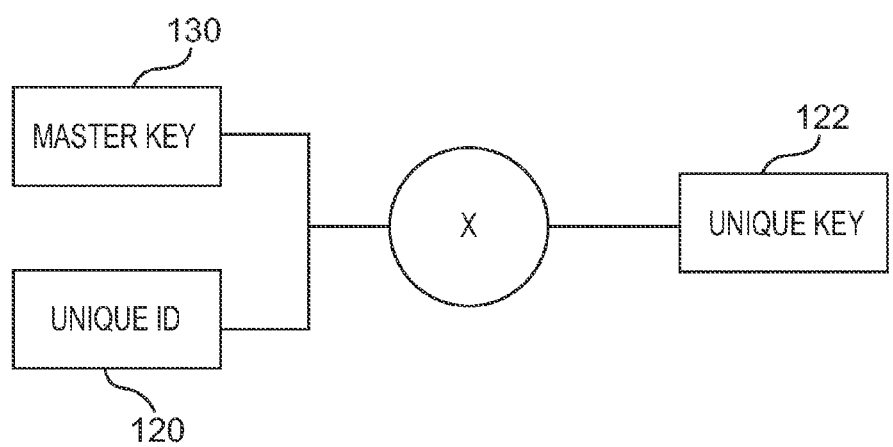
FIG. 3 conceptually illustrating an embodiment of generating a unique key.

FIG. 3 illustrates an embodiment of generating a unique key 122. In this embodiment, the chip unique identifier 120 and the master key 130 are combined to generate the unique key 122. In various embodiments, the format of the chip unique identifier 120 and the master key 130 is compatible with a symmetrical cryptography algorithm, such as the Advanced Encryption Standard (AES) or the Triple Data Encryption Standard (TDES). In other embodiments, the master key 130 includes a block of any suitable predetermined data or random data. In some embodiments, the unique identifiers 120 and corresponding unique keys 122 are stored in a secure database 214 external to the FPGA 100 for later retrieval.

In FIG. 2, the master key 130 is securely stored at the chip factory 114. In other embodiments, the master key 130 is securely stored at the trusted site 112. In one implementation illustrated in FIG. 2, the master key 130 is sent via a secure channel 216 to the trusted site 112 either to be stored at the trusted site 112 or in response to a request from the trusted site 112. When a request for information, such as a programming file, is received from the untrusted site 110, the unique identifier 120 is sent to the trusted site 112. In FIG. 2, the unique identifier 110 is included in the request for information, and is used along with the master key 130 to generate the unique key 122.

Figure 4:
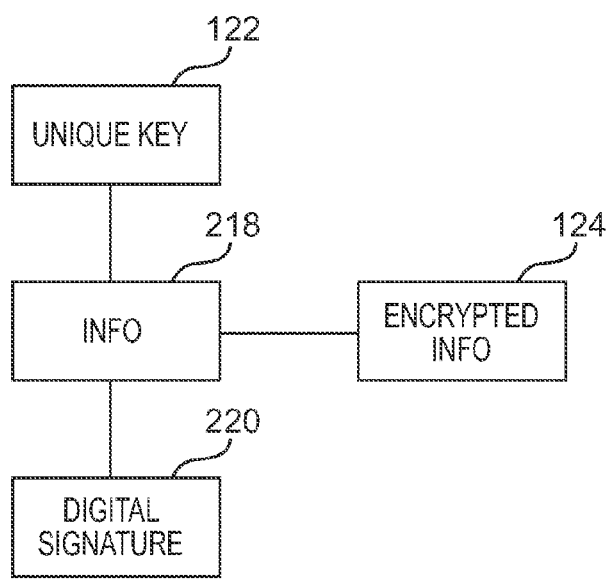
FIG. 4 conceptually illustrates an embodiment of the encryption of information.

As illustrated in FIG. 4, the information 218, which may comprise a programming file, is generated. In one embodiment, a digital signature 220 is used to provide authentication of the programming file 218. The authenticated programming file 218 is encrypted by using the chip unique key 122 to provide the encrypted information 124. The encrypted programming file is sent to the untrusted site over an unsecure (public) network 126 to be loaded into the FPGA 100. The FPGA 100 includes a suitable decryption core that can decrypt encrypted programming files. The decryption core may be, for example, a 128-bit AES decryption core or any other suitable symmetric key decryption core. The decryption core decrypts the programming file 218 that is used to program the FPGA 100.

In another implementation illustrated in FIG. 2, the trusted site 112 requests the unique identifiers 120 and corresponding unique keys 122 that are stored in the database 214 at the factory 114. This information is sent, for example, in the form of a manifest file via a secure channel 216 to the trusted site 112. When a request for the information 218 is received from the untrusted site 110, the unique identifier 120 is used to locate the corresponding unique key 122 from the manifest. As noted above, and referring to FIG. 4, once the programming file 218 is generated, the digital signature 220 is used to provide authentication of the programming file 218. The programming file 218 is encrypted by using the unique key 122, and the encrypted programming file 124 is sent to the untrusted site 110 to be loaded into the FPGA 100.

Figure 5:
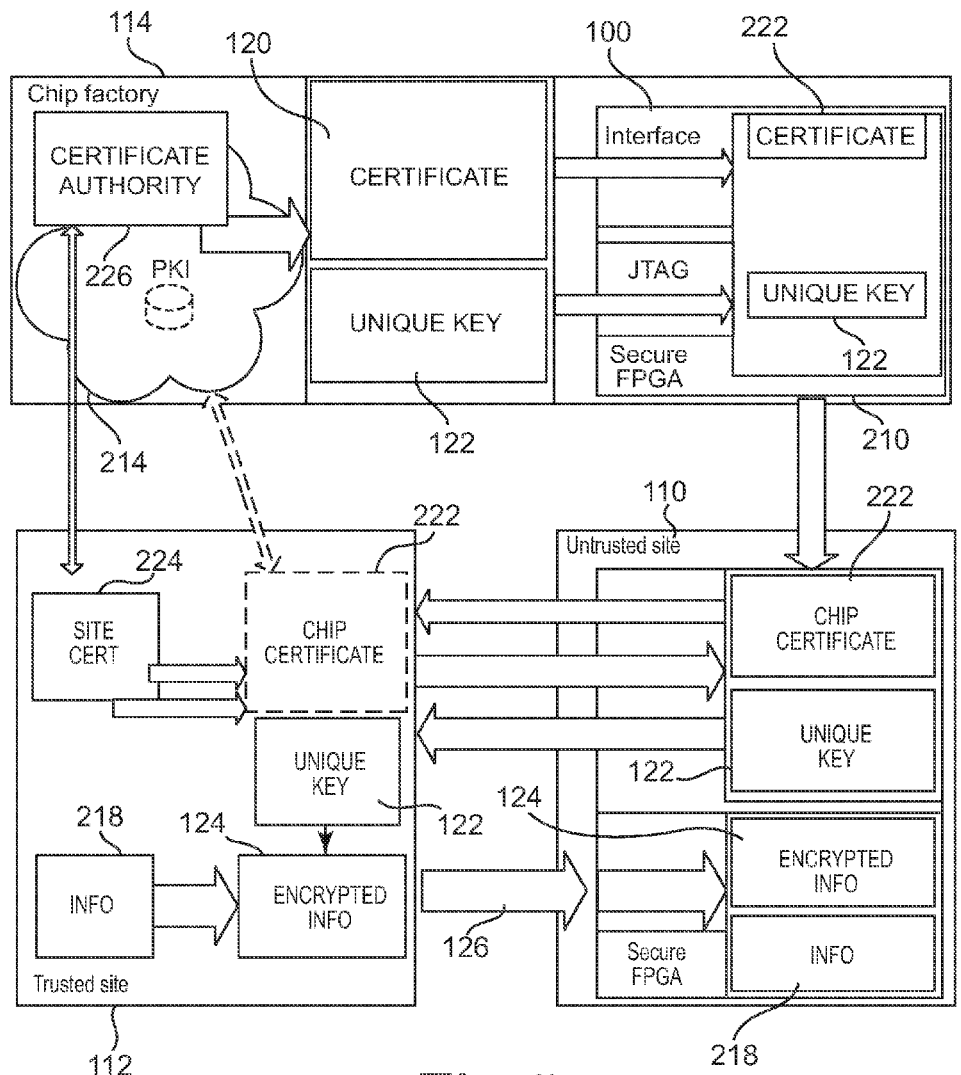
FIG. 5 is a block diagram conceptually illustrating embodiments of a method and system for transferring information to a device.

FIG. 5 is a block diagram conceptually illustrating embodiments of a method and system for transferring information to a device. In this embodiment, an asymmetric key algorithm is used. In FIG. 5, the unique identifier includes a first, or chip certificate 222 containing unique information and/or information that is derived from unique information. During the production of the FPGA 100 in a secure environment such as the chip factory 114, the chip certificate 222 is injected into the FPGA 100 along with the unique key 122. The chip certificate 222 may include, for example, a serial number, a public/private key pair, an expiration date, a factory signature, etc. This certificate is used for authentication, encryption and signature verification.

After the production phase, the FPGA 100 is shipped to the untrusted site 110. Information 218, such program files are generated via design software at a trusted site, such as the trusted site 112.

A second certificate, a site certificate 224, is signed by a trusted certificate authority 226. The site certificate 224 is used to authenticate the trusted site 112 to the FPGA 100. The chip certificate 222 and a chip challenge (e.g. a random number) from the FPGA 100 are sent to the trusted site 112. The trusted site 112 verifies the chip certificate 222 using a certificate from a certificate authority and/or certificates chain, and optionally verifies other unique information such as the serial number and/or the expiration date.

For site authentication of the trusted site 112, the trusted site 112 sends a chip challenge response, a site challenge (such as a random number) and the site certificate 224. The chip challenge response is generated by the trusted site 112 by signing the chip challenge using the trusted site private key. The FPGA 100 verifies the site certificate 224 confirming that the site certificate is signed by the chip factory certificate authority 226. The FPGA 100 verifies the chip challenge response using the public key received from the site certificate 224. The FPGA 100 signs the site challenge using the chip private key.

The FPGA 100 encrypts the unique key 122 using the trusted site public key that was extracted from the site certificate 224. The FPGA 100 signs the site challenge using the chip private key and sends the challenge response and the encrypted unique key 122 to the trusted site 112. The trusted site 112 verifies the challenge response using public key from the chip certificate 222 received earlier.

In the illustrated embodiment, the mutual trust is established when the FPGA 100 and the trusted site 112 both verify the challenges (the chip challenge and the site challenge). In other embodiments, the mutual trust is established when the FPGA 100 verifies the challenges (the chip challenge and the site challenge), or when the trusted site 112 verifies the challenges (the chip challenge and the site challenge). In other embodiments, the mutual trust is established when the FPGA 100 verifies the chip challenge or the site challenge, or when the trusted site 112 verifies the chip challenge or the site challenge. In the illustrated embodiment, the trusted site 112 decrypts the encrypted unique key 122 using the trusted site private key.

The unique key 122 can then be used to encrypt the programming file 218, and encrypted programming file 124 is sent to the untrusted site 110 over the public network 126 to be loaded into the FPGA 100. The FPGA 100 decrypts the encrypted programming files using a suitable decryption core, such as an AES decryption core or any other suitable symmetric decryption core.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for controlling a device, comprising:
locating a device at a production site:
assigning a unique identifier to the device and storing the unique identifier in the device at the production site;
generating a unique key for the device and storing the unique key in the device at the production site;
locating the device at a first site, wherein the first site is not the production site and is an untrusted site;
sending the unique identifier from the device to a second site, wherein the second site is not the production site and is a trusted site;
obtaining the unique key at the second site;
sending a master key from the production site to the second site, and wherein obtaining the unique key includes reconstructing the unique key using the unique identifier and the master key at the second site;
encrypting information using the unique key at the second site; and
sending the encrypted information from the second site to the device.

2. The method of claim 1, wherein the unique key is a symmetric key.

3. The method of claim 1, wherein encrypting the information comprises encrypting a program file.

4. The method of claim 1, further comprising:
decrypting the received encrypted information.

5. The method of claim 1, further comprising:
storing the unique identifier in a nonvolatile memory of the device.

6. The method of claim 1, wherein the unique key is generated at the production site using the unique identifier and a master key.

7. The method of claim 1, further comprising:
storing the unique key in a nonvolatile memory of the device.

8. The method of claim 1, wherein the master key is sent to the second site over a secure channel.

9. The method of claim 1, further comprising:
storing a plurality of the unique identifiers and corresponding unique keys in a database, wherein obtaining the unique key at the second site includes locating the unique key corresponding to the unique identifier sent from the device to the second site.

10. The method of claim 1, wherein the unique identifier includes a first certificate, and wherein the first certificate is stored in the device.

11. The method of claim 10, wherein the first certificate includes the unique identifier and an asymmetric encryption public/private key pair.

12. The method of claim 1, further comprising:
encrypting the unique key, wherein obtaining the unique key at the second site includes sending the encrypted unique key from the device to the second site.

13. A system, comprising:
a device storing a unique identifier and a unique key, wherein the device receives the unique identifier and the unique key at a production site prior to being located at a first site that is an untrusted site;
a computing system located at a second site that is a trusted site, wherein the computing system is configured to receive a master key from the production site and generate the unique key using the received master key and the received unique identifier;
a communications network connecting the device and the computing system; and
wherein the computing system is programmed to encrypt information using the unique key and the unique identifier received from the device over the network, and send the encrypted information from the second site to the device over the network.

14. The system of claim 13, wherein the device is a field updatable device.

15. The system of claim 13, wherein the device is a field programmable gate array (FPGA).

16. The system of claim 13, wherein the device includes a Joint Test Action Group (JTAG) interface.

17. The system of claim 13, wherein the unique identifier is associated with the unique key, and wherein the computing system obtains the unique key using the unique identifier.

18. A programmable system, comprising:
a chip factory at a production site configured to assign a unique identifier to a programmable device, and further configured to generate a unique key using the unique identifier and a master key;
the programmable device being configured to store the unique identifier and the unique key, wherein the device is located at a first site after receiving the unique identifier and the unique key at the production site, wherein the first site is an untrusted site;
a computing system located at a second site that is a trusted site; and a secure communication channel between the chip factory at the production site and the computing system at the second site, wherein the computing system receives the master key from the chip factory via the secure communication channel;

wherein the computing system generates the unique key using the unique identifier received from the programmable device and the master key received from the chip factory;

wherein the computing system is configured to encrypt a program for the programmable device using the unique key and send the encrypted program from the second site to the device.

19. A system for sending information to a programmable device, comprising:

a chip factory at a production site configured to assign a chip certificate and a unique key to a programmable device, and store the chip certificate and the unique key in the programmable device prior to locating the programmable device at a first, wherein the first site is not the production site and is an untrusted site;

a computing system at a second site having a site certificate received from the chip factory, wherein the computing system and the programmable device are configured to authenticate one another using the chip certificate and the site certificate, wherein the second site is not the production site and is a trusted site, wherein the computing system at the second site is configured to receive a master key from the production site, and reconstruct the unique key using the unique identifier and the master key at the second site, wherein the computing system is programmed to encrypt information using the unique key, and send the encrypted information to the device.

* * * * *